June 17, 1941.  J. O. WHITELEY, JR  2,246,332
PROCESS OF PRODUCING MOLDED ARTICLES
Filed Feb. 16, 1939
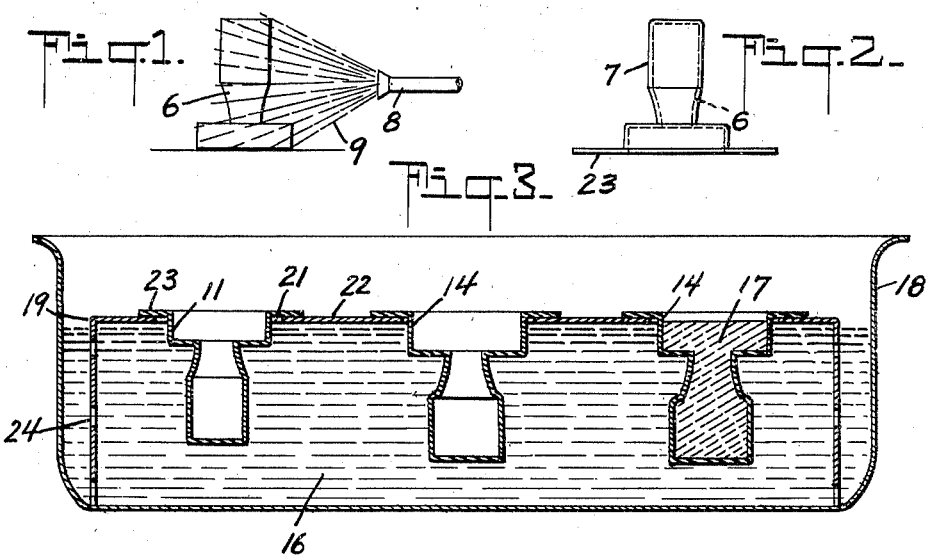
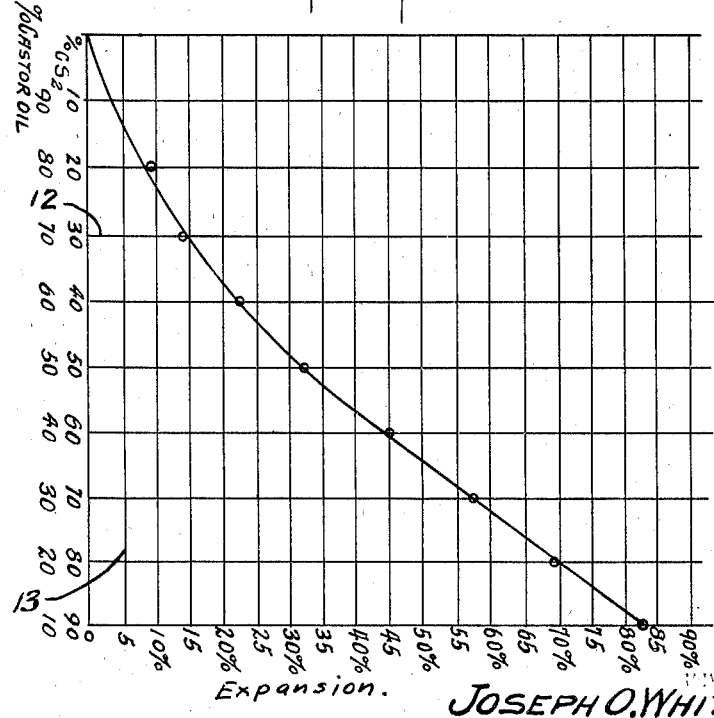
Joseph O. Whiteley, Jr.

Patented June 17, 1941

2,246,332

UNITED STATES PATENT OFFICE 2,246,332

PROCESS OF PRODUCING MOLDED ARTICLES

Joseph O. Whiteley, Jr., York, Pa., assignor to The Dentists' Supply Company of New York, New York, N. Y., a corporation of New York Application February 16, 1939, Serial No. 256,629

7 Claims. (Cl. 18—58)

This invention relates to the process of molding articles, and has particular reference to a process for preparing the mold, and the control of the dimensions of the article to be molded thereby.

The object of the invention is to provide an improved method for reproducing articles.

Another object is to provide an improved method of reproducing articles either in the exact dimensions of the article being reproduced or of reproducing an article smaller or larger than that being reproduced while still retaining proportionate dimensions.

A further object of the invention is to provide a method of producing articles wherein the article produced will be accurate as to details.

A still further object of the invention is to produce a mold which may be used for producing articles of the exact size, smaller size or larger size than the thing copied, and by means of which the article may be repeatedly reproduced.

According to the invention, the process comprises the steps of coating an article to be reproduced with a flexible latex or rubber-like material, then drying said coating, and then removing the coated article thereby to produce a matrix in which other articles may be formed. The matrix may be expanded to predetermined fixed dimensions by immersion of the entire mold or the outer surface only in a solution comprising an active expanding reagent, such as carbon disulphide, and a neutralizing reagent, such as castor oil. The article molded in said matrix may, therefore, have fixed dimensional proportions regardless of size.

The drawing illustrates an embodiment of the invention, and the views therein are as follows:

Figure 1 is a front elevation of an article being sprayed with a rubber-like solution for coating the same, Figure 2 is a like view showing the article having the coating dried, and forming a matrix or mold, Figure 3 is a vertical sectional view of a pan having a frame on which is mounted the matrix or mold of Figure 2, a like mold after the same has been expanded by the solution in said pan, and the same mold after same has had introduced into the same material for reproducing the article of Figure 1 in greater proportional dimensions, Figure 4 is a curve showing the degree of expansion with a solution having varying proportions of the active expanding reagent and neutralizing reagent.

The article 6 shown in Figure 1 is for illustrative purposes only, and it will be understood that artificial teeth and the like may be reproduced according to the present invention, so that every detail of the shape of said article produced will be reproduced by the covering or mold 7 shown in Figure 2.

In Figure 1, the nozzle 8 is directed against the article 6 in order to spray the same with a solution of rubber-like material.

While I have shown the spraying of the article 6 in Figure 1, it will be understood that the coating may be applied in any desired manner, such for instance as dipping, brushing, electroplating, etc. Furthermore, a coating may be applied by any of these methods and allowed to dry, or partially dry, after which it may be again coated in any desired manner, and this may be repeated until the desired thickness of rubber-like material is obtained.

When the article 6 is removed from its rubber-like coating 7, it will produce a matrix 11, (see Figure 3), and due to its inherent contraction tendencies, the inside dimensions of this matrix will be found to be from two to five percent smaller than the article 6, consequently, if plastic or flowable material is introduced into the matrix and allowed to harden, the reproduced article will be slightly smaller than the original article on which the matrix is formed.

This variation may be remedied by submerging either the outer surface or the entire mould in a solution having an active expanding reagent and a neutralizing reagent. The proportion of expansion may be definitely fixed by varying the proportions of the ingredients, in the manner shown by the graph in Figure 4. In this graph, the ordinates 12 represent the solution in varying proportions while the abscissa 13 represent the percentage of expansion. Of course, this graph has been prepared from actual experimentation where the active expanding reagent is carbon disulphide and the neutralizing reagent is castor oil. Solutions of other ingredients may produce different degrees of expansion. It has been found that other solutions may be employed for expanding the rubber matrix in fixed dimensional proportions, and while the carbon disulphide-castor oil solution is quite satisfactory, these other solutions are within contemplation of the present invention. Some of these solutions are ether-alcohol, turpentine-alcohol, carbon tetrachloride-alcohol.

In Figure 3, the matrix 14 shows expansions after being subjected to the solution 16 for a period of time sufficiently great to allow the active expanding reagent to perform its full effect upon said matrix. This time, of course, may vary depending upon the proportion of ingredients in the solution.

In Figure 3, there is also shown the matrix 14 with reproduction material 17 in the same, the outer surface of the matrix being maintained within the solution 16.

The invention has within its contemplation the use of any desired material for forming the reproduced article, that is to say, it may be plaster of Paris, cement, porcelain material or, in fact, any material which may be capable of hardening and which can be introduced into the matrix without distorting same. When the material in the matrix has hardened, the matrix may be removed from the solution and the article removed from the matrix.

In Figure 3, the pan 18 is provided with a frame 19 having openings 21 in the horizontal top 22 of said frame which provides a surface for the skirt 23 of the matrix to rest upon while the matrix proper may be submerged in the solution 16 which is allowed to flow through the perforations 24.

The inactive or neutralizing reagent, when mixed with the active reagent, serves to prevent the solution of the matrix in the active reagent, and also serves to control the amount of expansion produced, so that with a solution of carbon disulphide and castor oil, for example, the matrix may be reused repeatedly, and at frequent intervals to produce the object in full detail, and in any desired expansion.

This present method of reproducing and enlarging articles has definite advantages over the pantograph method. First: This method will reproduce an object in exact and accurate detail; whereas, the pantograph method will not reproduce fine detail. Second: This method is faster in reproducing and much more economical in equipment. Third: By this method a number of objects may be reproduced simultaneously, whereas by the pantograph method only one object at a time can be carved. Fourth: The matrix may be used repeatedly and will produce many different sizes from the original matrix.

Expansion of the matrix may be accomplished by complete submergence in the solution so that both the inner and outer surfaces of the matrix are in contact with the solution. In this case, the solution must be removed from the cavity portion of the matrix before the plaster can be cast. Accordingly, it is considered desirable to submit the outer surface only of the matrix to the expanding solution.

The cavity portion of the matrix may be filled with plaster without removing the matrix itself from the expanding solution, thereby eliminating any distortion, any uneven or rapid shrinkage of the matrix which would take place were the matrix removed from the expanding solution before casting the plaster.

The absence of any liquid particles on the inner walls of the matrix insures perfect reproduction of all surface details in the plaster cast and prevents a porous condition on the surface of the plaster cast which would result if there were liquid particles on the inner walls of the matrix when the plaster cast is made.

The castor oil in the solution acts as a neutralizer of the solvent action upon the latex or other rubber-like matrix of an active reagent such as carbon disulphide. It reduces the tendency of the matrix to tear when expanded and serves to preserve the matrix. It also assists in the removal of the plaster object from the matrix easily and quickly.

Castor oil in the solution increases the ease with which the matrix is removed from the object by permitting the matrix to slide over itself as it is being turned inside out. Castor oil in the expanding solution permits more repeated uses of the matrix by increasing its resistance to tearing. Castor oil in the expanding solution gives the active reagent a lower rate of evaporation and causes a slower rate of shrinkage of the matrix than other inactive reagents.

Of course, the process and means for carrying out the same as illustrated and described herein may be modified in various ways without departing from the invention herein set forth and hereafter claimed.

The invention is hereby claimed as follows:

1. The process of producing articles in a flexible mold comprising the steps of coating with rubber-like material an article of the same shape as that to be produced, allowing the coating to dry and form a flexible mold, then removing the article to permit the contraction of the mold, then treating said mold with a solution comprising an active swelling solution and a diluting agent proportioned to expand same to predetermined fixed dimensions, then introducing hardenable reproduction material into said mold, permitting said reproduction material to harden, and then removing said formed article from said mold.

2. The process of producing articles in a flexible mold comprising the steps of coating with rubber-like material an article of the same shape as that to be produced, allowing the coating to dry and form a flexible mold, then removing the article to permit the contraction of the mold, then treating the outside surface of said mold with a solution having the ability to swell same to predetermined fixed dimensions, then introducing hardenable reproduction material into said mold, permitting said reproduction material to harden, and then removing said formed article from said mold.

3. The process of producing articles in a flexible mold comprising the steps of coating with rubber-like material an article of the same shape as that to be produced, allowing the coating to dry and form a flexible mold, then removing the article to permit the contraction of the mold, then treating said mold with a solution having the ability to swell same to a degree whereby its inner dimensions are correspondingly larger than the dimensions of the article on which it was formed, then introducing hardenable reproduction material into said mold while keeping the outer surface of said mold submerged in said solution, permitting said reproduction material to harden, and then removing said formed article from said mold.

4. The process of producing articles in a flexible mold comprising the steps of first coating the article to be reproduced with rubber-like material, permitting the material to dry and form a flexible mold, then removing the article from the flexible mold, then swelling said mold, then introducing a hardenable reproduction material into said mold, then permitting said reproduction material to harden, and then removing the reproduced article from the mold.

5. The process of producing articles in a flexible mold comprising the steps of coating with rubber-like material an article of the same shape as that to be produced, allowing the coating to dry and form a flexible mold, then removing the article, then treating said mold with a solution comprising castor oil and carbon di sulphide so proportioned that said mold swells to a predetermined size whereby its inner dimensions are larger than the corresponding dimensions of the article on which it was formed, then introducing hardenable reproduction material into said mold, permitting said reproduction material to harden, and then removing said formed article from said mold.

6. The process of producing articles in a flexible mold comprising the steps of coating with rubber-like material an article of the same shape as that to be produced, allowing the coating to dry and form a flexible mold, then removing the article, then treating said mold with a solution having the ability to swell the same to predetermined fixed dimensions, then introducing hardenable reproduction material into said mold, permitting said reproduction material to harden, and then removing said formed article from said mold.

7. The process of producing articles comprising the steps of providing a flexible mold of rubber-like material, then increasing the size of said mold by treating the same with a solution having the ability to swell said material, then introducing a hardenable reproduction material into said treated mold, permitting said material to harden, and then removing said molded reproduction material from the mold.

JOSEPH O. WHITELEY, Jr.

DISCLAIMER 2,246,332.—*Joseph O. Whiteley, Jr.*, York, Pa. PROCESS OF PRODUCING MOLDED ARTICLES. Patent dated June 17, 1941. Disclaimer filed January 28, 1942, by the inventor; the assignee, *The Dentists' Supply Company of New York*, consenting.

Hereby disclaims the following words on page 1, second column, lines 50 to 52, inclusive—

"Some of these solutions are ether-alcohol, turpentine-alcohol, carbon tetrachloride-alcohol."

and disclaims claims 1, 2, 3, 4, 6, and 7.

[*Official Gazette March 24, 1942.*]